United States Patent Office 2,956,014
Patented Oct. 11, 1960

2,956,014
METHOD FOR IMPROVING ODORLESS NAPHTHAS

George W. Ayers, Chicago, and William A. Krewer, Arlington Heights, Ill., assignors to The Pure Oil Company, Chicago, Ill., a corporation of Ohio No Drawing. Filed June 15, 1959, Ser. No. 820,078

9 Claims. (Cl. 208—289)

This invention relates to the preparation of odorless industrial naphthas. It is more specifically concerned with the improvement of the odor quality of odorless naphthas by treatment with an aqueous solution containing carboxymethylpyridinium hydrazide chloride.

Because of the inherent qualities and advantages of odorless naphthas, such as their non-toxicity, good solvent properties, low cost, and availability, they are used in many industrial services, particularly in the surface coating industry. Naphthas are generally defined as hydrocarbon mixtures of various boiling ranges, usually with end boiling points below 550° F., but occasionally between 550° and 600° F. Most of them are obtained by the fractional distillation of petroleum; others are obtained by the fractional distillation of alkylates or of coal tar, or from the solvent extraction of petroleum fractions. Within this definition are included such products as straight-run petroleum naphthas, heavy naphthas, odorless naphthas, coal-tar naphthas, and aromatic petroleum naphthas. All of these naphthas have very pronounced odors except in the case of odorless naphthas as prepared by the fractional distillation of heavy alkylates, or by the treatment of straight-run petroleum naphthas with silica gel. Naphthas boiling below 300° F. are not odorless because the hydrocarbons themselves have odors. Naphthas with initial boiling points between 300° and 350° F., and particularly between 340° and 360° F., may be essentially odorless if prepared by careful fractional distillation of heavy alkylates, or by percolation of straight-run petroleum naphthas of comparable boiling range through silica gel until essentially all of the aromatic hydrocarbons are removed. Fractional distillation of heavy alkylates oftentimes gives unpredicable results and the products may contain small amounts of odorous compounds, the exact composition of which is unknown but which may include aldehydes, ketones, sulfur compounds, or even unsaturated hydrocarbons. Many of the odorous compounds are very tenacious and the odor of the naphtha product is little improved, or even made more disagreeable, by ordinary caustic soda treatment. Specific applications of odorless naphthas require that they be of high and uniform quality. This invention is directed to one of the more perplexing problems, that of improving the odor of such naphthas so that uniform, commercially-acceptable products are obtained.

Although many refining processes are available which remove substantial amounts of obnoxious sulfur compounds which impart odors to naphthas, these processes do not always give results which are consistent, and such processes are not applicable to heavy alkylates. There are many claims made in the art to processes for removing odorous compounds from hydrocarbons or changing them into less odorous substances. These processes may be classified as sweetening, solvent extraction, and adsorption processes. However, because of the peculiar nature of odor formation in naphthas, these prior art chemical and physical methods cannot be depended upon to give uniform results.

In accordance with the present invention, it has been found that the odor quality of essentially odorless naphthas is improved, and the odor stability maintained during storage or extended used, by treatment with solutions (particularly aqueous solutions) containing small amounts of carboxymethylpyridinium hydrazide chloride. The active reagent has the following formula, $$(C_5H_5N+)(Cl^-)CH_2CONHNH_2$$

and is also known under the names of acethydrazide-pyridinium chloride and Girard's P reagent. We have found that in treating essentially odorless naphthas with aqueous solutions of carboxymethylpyridinium hydrazide chloride, the odorous materials apparently combine chemically with this reagent to produce water-soluble products. The odorous materials accordingly are extracted in and are removed by the aqueous phase. The reaction of the carboxymethylpyridinium hydrazide chloride with the odorous materials appears to be rapid, and the treatment can be effected by countercurrent, continuous processing of the nearly-odorless naphthas in a tower with the carboxymethylpyridinium hydrazide chloride solution at ambient temperature. The treating operation may, if desired, be carried out at temperatures up to 200° F., the lower temperature limit being that at which the treating solution is still fluid. The treatment may be conducted batchwise by mixing together the naphthas and the carboxymethylpyridinium hydrazide chloride solution, and allowing phase separation wherein naphthas forms the upper phase. The treatment may also be carried out, although less effectively, by allowing the borderline, or poor-odor-quality, odorless naphtha to stand over an aqueous solution of carboxymethylpyridinium hydrazide chloride solution. Other methods of application will become apparent from a further description of this invention.

Accordingly, it becomes a primary object of this invention to provide a process for preparing odorless industrial naphthas.

The second object of this invention is to provide a process for preparing odorless industrial naphthas by treatment of unstable, but nearly odor-free, naphthas with carboxymethylpyridinium hydrazide chloride.

Still another object of this invention is to provide a process for removing odorous materials from hydrocarbon mixtures, particularly heavy alkylates, by treatment or extraction with aqueous solutions containing carboxymethylpyridinium hydrazide chloride.

These and further objects of the invention will become apparent or be described as the specification herein proceeds.

In order to demonstrate the invention, the following examples are presented:

EXAMPLE I

A 100-cc. portion of an odorless naphtha of extremely poor odor quality (350°–400° F. boiling range and prepared by steam distillation of heavy alkylate originating from alkylate prepared by the sulfuric acid process) was shaken for a few minutes with 10 cc. of an aqueous solution containing 1% of carboxymethylpyridinium hydrazide chloride. There was immediate separation of the naphtha and aqueous phases. The odorless naphtha was greatly improved in odor quality by this treatment.

A similar treatment of 100 cc. of the original odorless naphtha of extremely poor odor quality with 10 cc. of water was without effect on the odor quality.

EXAMPLE II

A 100-cc. portion of nearly-odorless naphtha (350°–400° F. boiling range and originating from an alkylate prepared by the hydrofluoric acid process) was shaken for a few minutes with 10 cc. of an aqueous solution containing 1% carboxymethylpyridinium hydrazide chloride.

There was an immediate separation of the naphtha and aqueous phases. The resulting odorless naphtha was very noticeably improved in odor quality.

Treatment of 100 cc. of the original odorless naphtha with 10 cc. of water had no effect on the odor quality of the naphtha.

EXAMPLE III

A 100-cc. portion of an odorless naphtha of extremely poor odor quality (350°–400° F. boiling range and prepared by steam distillation of heavy alkylate originating from alkylate prepared with sulfuric acid process) was shaken for a few minutes with 10 cc. of an aqueous solution containing 1% of carboxymethyltrimethylammonium hydrazide chloride (Girard's T reagent). The naphtha phase, which separated readily, was not improved in odor quality by this treatment.

EXAMPLE IV

A 100-cc. portion of a nearly-odorless naphtha (350°–400° F. boiling range and originating from an alkylate prepared by the hydrofluoric acid process) was shaken for a few minutes with 10 cc. of an aqueous solution containing 1% of carboxymethyltrimethylammonium hydrazide chloride (Girard's T reagent). The naphtha phase, which separated readily, was not improved in odor quality by this treatment.

From the foregoing experiments, it is seen that carboxymethylpyridinium hydrazide chloride is unique in its ability to remove odorous materials from nearly-odorless naphthas. Since the removal of the odorous materials from these naphthas apparently is one of chemical combination, the treating solution may be used over and over again in the further treatment of odorless naphtha until the carboxymethylpyridinium hydrazide chloride is spent or completely reacted. Aqueous solutions containing approximately 0.01 to 10% or more of carboxymethylpyridinium hydrazide chloride may be used; also, more concentrated solutions, varying in carboxymethylpyridinium hydrazide chloride content up to the saturated solution, come within the scope of this invention. Widely variant contact times may be employed, depending upon the temperature at which the treatment is conducted. In general, as seen from the foregoing examples, a contact time of about 0.1 to 10 minutes will be effective at ambient temperatures. Lower temperatures may require longer contact times. Poor-quality, or borderline odorless naphthas may be subjected to successive treatment with aqueous solutions of carboxymethylpyridinium hydrazide chloride containing successively weaker concentrations, or successively stronger concentrations, in countercurrent treating operations in convenient and economically practicable ratios of naphtha to treating solution. After treatment with the aqueous solution of carboxymethylpyridinium hydrazide chloride, the odorless naphtha may be washed with water and subsequently distilled, if desired.

The amount of carboxymethylpyridinium hydrazine chloride used per amount of naphtha will be subject to considerable variation, depending upon the amount of odorous or odorforming compounds present in the naphtha to be treated. At least a stoichiometric amount of carboxymethylpyridinium hydrazide chloride to react with or counteract the odorous compounds in the naphtha could be used. An excess over the stoichiometric amount is recommended. More specifically, between about .01 to 1.0 parts of carboxymethylpyridinium hydrazide chloride per 100 parts of naphtha may be used.

The naphthas that can be treated in accordance with this invention include, (1) heavy alkylates or heavy alkylate fractions boiling from 300° F. to as high as 600° F. and which contain small amounts or traces of odorous materials arising during manufacturing or processing steps, or during storage; and (2) petroleum fractions boiling from about 300° F. to 600° F. which have been essentially denuded of their aromatic content by treatment with silica gel. The invention has particular application to naphthas boiling in the range of 300–525° F. and including heavy alkylate fractions prepared by the distillation of heavy alkylates at pressures under atmospheric and/or with steam. The heavy alkylates are obtained as bottoms from the distillation of alkylates, and may constitute 5–20% of the whole alkylates. Alkylates are produced by the alkylation of olefins with alkanes. An example of such material would be the product of the alkylation of isobutylene with isobutane in the presence of hydrofluoric acid.

The following table gives the distillation characteristics of a number of naphthas which can be treated in accordance with this invention.

*Tests on representative odorless naphthas and heavy alkylates*

| API Grav. | Distillation | | | | | | | | | | | | | | | | Odor |
|---|---|---|---|---|---|---|---|---|---|---|---|---|---|---|---|---|---|
| | IBP | 5% | 10% | 20% | 30% | 40% | 50% | 60% | 70% | 80% | 90% | 95% | E. P. | Percent Rec. | Percent Res. | Percent Loss | |
| 54.0* | 347 | 354 | 356 | 358 | 360 | 363 | 366 | 369 | 374 | 383 | 414 | 466 | 517 | 98.0 | 1.6 | 0.4 | Slight (essentially odorless) |
| 54.5** | 352 | 358 | 360 | 360 | 361 | 362 | 362 | 363 | 364 | 366 | 370 | 377 | 393 | 98.8 | 1.2 | 0.0 | Do. |
| 53.6** | 360 | 367 | 368 | 369 | 369 | 370 | 371 | 372 | 373 | 376 | 380 | 388 | 413 | 98.6 | 1.2 | 0.2 | Do. |
| 51.4** | 372 | 378 | 380 | 382 | 385 | 388 | 392 | 397 | 408 | 425 | 481 | 540 | 573 | 99.0 | 1.0 | 0.0 | Do. |
| 51.4** | 361 | 366 | 368 | 371 | 373 | 376 | 381 | 386 | 396 | 416 | 468 | 509 | 543 | 98.1 | 1.4 | 0.5 | Do. |
| 55.4* | 351 | 354 | 355 | 356 | 357 | 358 | 359 | 360 | 362 | 365 | 368 | 372 | 385 | 98.7 | 1.3 | 0.0 | Do. |
| 54.1* | 355 | 359 | 360 | 363 | 364 | 367 | 369 | 373 | 379 | 388 | 418 | 468 | 512 | 98.4 | 1.1 | 0.5 | Do. |
| 55.2* | 348 | 352 | 353 | 355 | 356 | 357 | 359 | 361 | 363 | 365 | 370 | 377 | 406 | 98.8 | 1.2 | 0.0 | Do. |

*Made from alkylate produced by the hydrofluoric acid process.
**Made from alkylate produced by the sulfuric acid process.

What is claimed is:

1. A method of preparing odor-free naphthas which comprises treating said naphthas with carboxymethylpyridinium hydrazide chloride at a temperature up to 200° F. and recovering an odor-free product from the mixture.

2. A method in accordance with claim 1 in which said naphtha boils between about 300° and 600° F., and is characterized by slight odor.

3. A method in accordance with claim 1 in which said naphtha boils between about 300° and 600° F., and is characterized by odor instability.

4. A method in accordance with claim 2 in which the naphtha is a heavy alkylate fraction boiling in the range of about 340° to 573° F.

5. A method in accordance with claim 2 in which the naphtha is a petroleum fraction boiling in the range of about 300° to 600° F. and which has been essentially denuded of its aromatic content by treatment with silica gel.

6. A method in accordance with claim 1 in which said treatment is conducted by contacting said naphtha with an aqueous solution containing said carboxymethylpyridinium hydrazide chloride.

7. A method in accordance with claim 6 in which said carboxymethylpyridinium hydrazide chloride is present in a concentration of a least 0.01 weight percent.

8. A method of preparing odor-free naphthas which comprises treating said naphthas with carboxymethylpyridinium hydrazide chloride at a temperature of about 35° to 200° F. and recovering an odor-free product from the mixture.

9. A method of preparing odor-free naphthas which comprises treating said naphthas at a temperature up to 200° F. with between about 0.01 to 1.0 parts of carboxymethylpyridinium hydrazide chloride per 100 parts of naphthas and recovering an odor-free product from the mixture.

References Cited in the file of this patent
UNITED STATES PATENTS

| | | |
|---|---|---|
| 2,092,739 | Van Dijck | Sept. 7, 1937 |
| 2,162,195 | Greensfelder et al. | June 13, 1939 |
| 2,744,051 | Robinson | May 1, 1956 |
| 2,767,119 | Forchielli | Oct. 16, 1956 |
| 2,878,181 | Ayers et al. | Mar. 17, 1959 |